(12) United States Patent
Burkman

(10) Patent No.: US 9,478,779 B2
(45) Date of Patent: Oct. 25, 2016

(54) CELL TO CELL TERMINAL CONNECTIONS FOR A HIGH VOLTAGE BATTERY

(71) Applicant: Ford Global Technologies, LLC, Dearborn, MI (US)

(72) Inventor: Wesley Edward Burkman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 14/464,191

(22) Filed: Aug. 20, 2014

(65) Prior Publication Data
US 2016/0056430 A1    Feb. 25, 2016

(51) Int. Cl.
*H01M 2/10* (2006.01)
*H01M 2/22* (2006.01)
*H01M 2/30* (2006.01)

(52) U.S. Cl.
CPC ......... *H01M 2/1083* (2013.01); *H01M 2/1077* (2013.01); *H01M 2/22* (2013.01); *H01M 2/30* (2013.01); *H01M 2220/20* (2013.01)

(58) Field of Classification Search
None
See application file for complete search history.

(56) References Cited

U.S. PATENT DOCUMENTS

| 6,495,282 | B1 * | 12/2002 | Yoshida | H01M 2/1083 429/153 |
|---|---|---|---|---|
| 7,508,165 | B2 | 3/2009 | Sobue et al. | |
| 8,235,732 | B2 | 8/2012 | Garascia et al. | |
| 2003/0017387 | A1 * | 1/2003 | Marukawa | H01M 2/1077 429/156 |
| 2003/0091896 | A1 * | 5/2003 | Watanabe | H01M 2/1077 429/158 |
| 2005/0142439 | A1 * | 6/2005 | Lee | H01M 2/021 429/163 |
| 2007/0054561 | A1 | 3/2007 | Gutman et al. | |
| 2011/0293994 | A1 * | 12/2011 | Casoli | H01M 2/266 429/158 |
| 2012/0244403 | A1 | 9/2012 | Maskew et al. | |
| 2013/0189560 | A1 | 7/2013 | Widhalm | |
| 2013/0273411 | A1 * | 10/2013 | Kim | H01M 2/30 429/158 |
| 2013/0273412 | A1 | 10/2013 | Okada et al. | |
| 2014/0042957 | A1 | 2/2014 | Al-Kadi et al. | |

* cited by examiner

*Primary Examiner* — Alix Eggerding
(74) *Attorney, Agent, or Firm* — David B. Kelly; Brooks Kushman P.C.

(57) ABSTRACT

A traction battery assembly is provided which may include first and second arrays spaced apart and each having a plurality of battery cells. The battery cells may each have a positive and a negative terminal on a cell face facing the other array. The cells may be oriented in tilted stacks such that the terminals of at least one of the cells of the first array are aligned with oppositely charged terminals of two different cells of the second array. The assembly may also include a frame supporting and orienting the cells such that the cells of the arrays are tilted at opposing and inversely equal angles which are based on a width and length of each battery cell to facilitate the alignment of the terminals of at least one of the cells of the first array with the oppositely charged terminals of two different cells of the second array.

18 Claims, 8 Drawing Sheets

CELL TO CELL TERMINAL CONNECTIONS FOR A HIGH VOLTAGE BATTERY

TECHNICAL FIELD

This disclosure relates to battery cell orientations to assist in facilitating electrical connections between battery cell terminals for high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) may contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A traction battery assembly includes first and second arrays spaced apart and each having a plurality of prismatic cells each with a positive and a negative terminal on a cell face facing the other array. The cells are oriented in tilted stacks such that the terminals of at least one of the cells of the first array are aligned with oppositely charged terminals of two different cells of the second array. The assembly may also include a frame supporting and orienting the cells such that the cells of the arrays are tilted at opposing and inversely equal angles which are based on a width and length of each battery cell to facilitate the alignment of the terminals of at least one of the cells of the first array with the oppositely charged terminals of two different cells of the second array. The positive and negative terminals may define substantially flat contact surfaces. The frame may be configured to apply a lateral compression force against each of the arrays such that the aligned positive and negative terminals at least partially contact one another. The terminals may be tabs extending at least partially through planes defined by respective upper and lower faces of the respective cell. The tabs may be joined together. At least one of the positive terminals and at least one of the negative terminals at opposite longitudinal ends of the arrays may be in electrical connection with a wire harness or electrical output conductor. At least one of the cells of the first array may be tilted at a first angle and the two different cells of the second array may be tilted at a second angle. A degree of the first and second angles relative to a vertical axis may be based on a cell width and cell length.

A traction battery assembly includes first and second arrays each having a plurality of cells with a positive and a negative terminal facing the opposite array. The positive terminals of the cells of the first array are located at an upper portion of a cell side face and the negative terminals of the cells of the second array are located at an upper portion of a cell side face. The assembly also includes a frame orienting the cells of both arrays in opposing tilted orientations such that some of the positive terminals of the first array are in registration with some of the negative terminals of the second array. A plurality of plates may be fused between the respective positive and negative terminals in registration with one another. The assembly may not include a busbar module. The frame may include opposing longitudinal components configured to apply a clamping load in a first direction to the first array and a clamping load in a second direction to the second array. The clamping loads may be such that the respective positive and negative terminals in registration with one another are in at least partial contact with one another. The tilted orientations of the cells of both arrays may be based on a width and length of the cell such that the terminals of at least one of the cells of the first array are in registration with oppositely charged terminals of two different cells of the second array. The cells may be prismatic cells. The positive and negative terminals of each cell may be located on only one face of the cell. Male or female connectors may house each of the terminals such that oppositely charged terminals are electrically connected when the respective male and female connectors mate. The terminals may be tabs extending at least partially through planes defined by respective upper and lower faces of the respective cell and the tabs may be ultrasonically welded together.

A fraction battery assembly includes a plurality of battery cells each including opposing front faces separated by an end and a positive terminal extending from the end and folded to partially cover one of the faces. The plurality of battery cells also include a negative terminal extending from the end and folded to partially cover the other of the faces. The plurality of battery cells are stacked such that at least one of the positive terminals is aligned with one of the negative terminals. A frame may support the cells and include longitudinal end plates configured to apply opposing longitudinal compression forces to the cells such that the positive terminals contact the respective negative terminals of the adjacent cell. The battery cells may be pouch cells and the terminals may be foil terminals. The battery cells may be prismatic cells and the faces may include a metallic housing and an electrical insulator component for each portion of the face under which the respective terminal partially covers.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
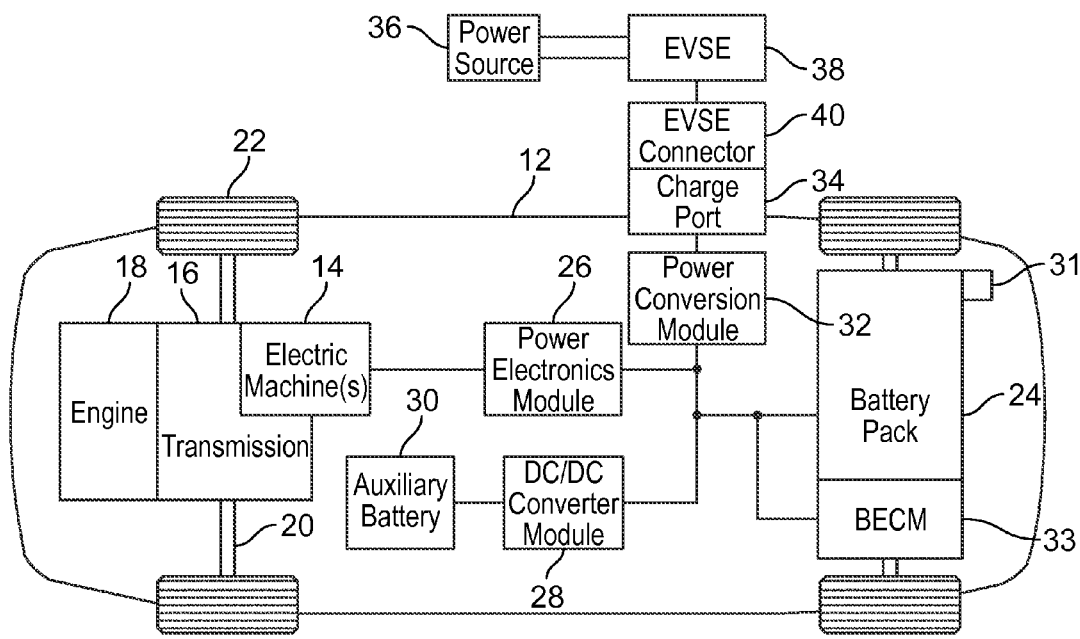
FIG. 1 is a schematic illustration of a battery electric vehicle.

FIG. 1 depicts a schematic of an example of a plug-in hybrid-electric vehicle (PHEV). A vehicle 12 may comprise one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 may provide propulsion and deceleration capability when the engine 18 is turned on or off. The electric machines 14 may also act as generators and provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that may be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors may isolate the fraction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the fraction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electronic control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the fraction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The fraction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another and structural components. The DC/DC converter module 28 and/or the BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cells 92 within the battery cell array 88 during vehicle operations. Uniform thermal fluid distribution and high heat transfer capability are two thermal plate 90 considerations for providing effective thermal management of the battery cells 92 within the battery cell arrays 88 and other surrounding components. Since heat transfers between thermal plate 90 and thermal fluid via conduction and convection, the surface area in a thermal fluid flow field is important for effective heat transfer, both for removing heat and for heating the battery cells 92 at cold temperatures. For example, charging and discharging the battery cells generates heat which may negatively impact performance and life of the battery cell array 88 if not removed. Alternatively, the thermal plate 90 may also provide heat to the battery cell array 88 when subjected to cold temperatures.

Figure 2:
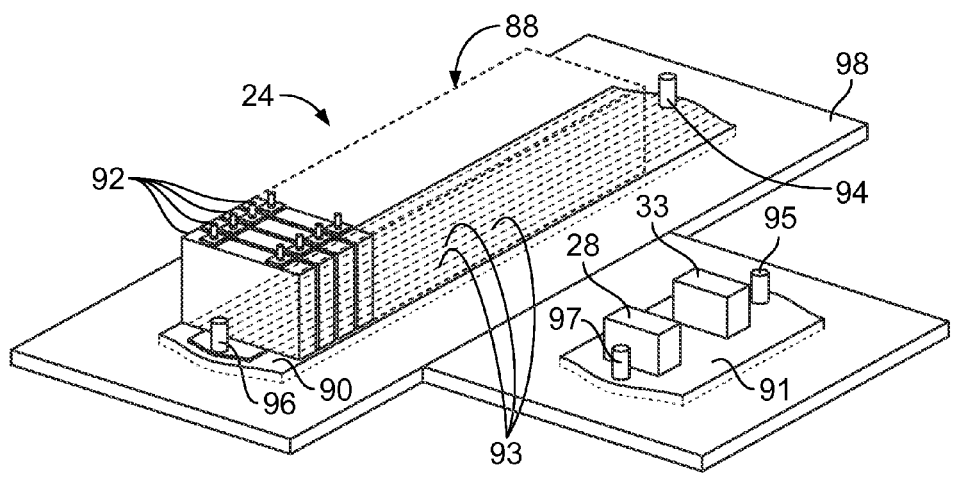
FIG. 2 is a perspective view of a portion of a thermal management system for the traction battery of the vehicle in FIG. 1.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, the thermal plate 91, the battery cell array 88, and other components. The battery tray 98 may include one or more recesses to receive thermal plates.

Different battery pack configurations may be available to address individual vehicle variables including packaging constraints and power requirements. The battery cell array 88 may be contained within a cover or housing (not shown) to protect and enclose the battery cell array 88 and other surrounding components, such as the DC/DC converter module 28 and the BECM 33. The battery cell array 88 may be positioned at several different locations including below a front seat, below a rear seat, or behind the rear seat of the vehicle, for example. However, it is contemplated the battery cell array 88 may be positioned at any suitable location in the vehicle 12.

Figure 3:
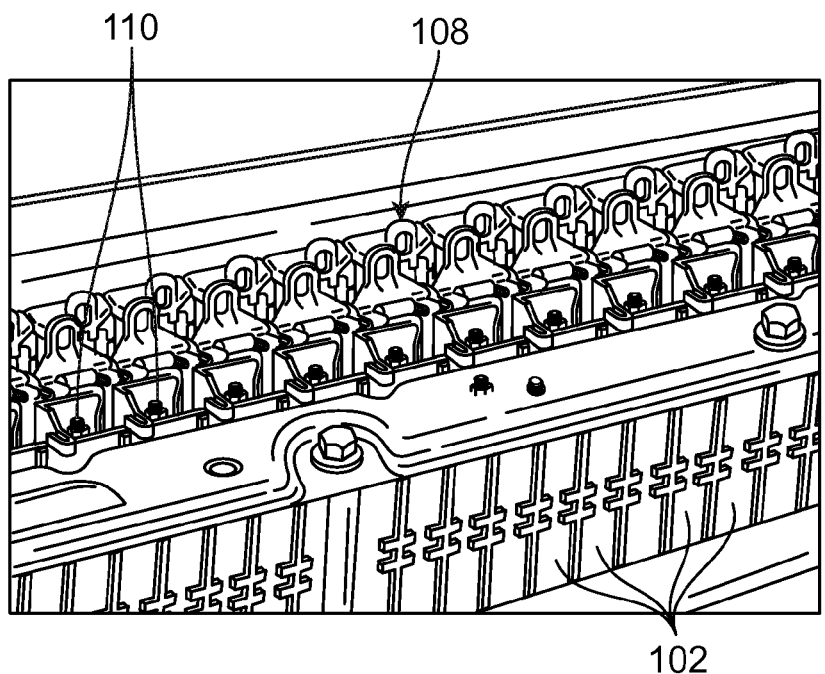
FIG. 3 is a fragmentary perspective view of a portion of a traction battery showing an example of a busbar module facilitating alignment of terminals of battery cells.
Figure 4:
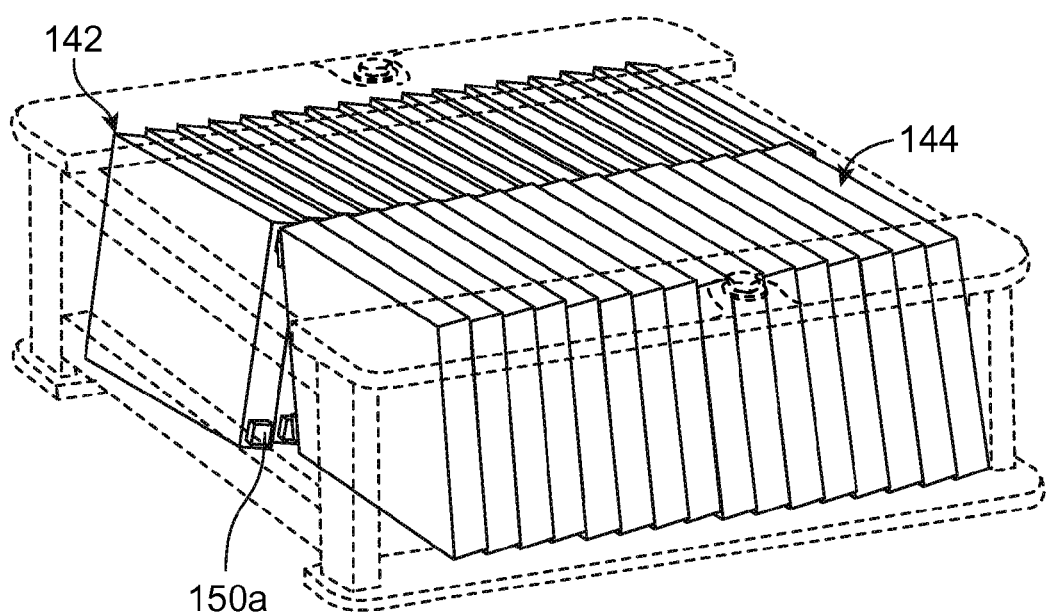
FIG. 4 is a perspective view of a portion of a traction battery assembly including two battery cell arrays having a plurality of battery cells oriented in tilted stacks with terminals facing one another.
Figure 5:
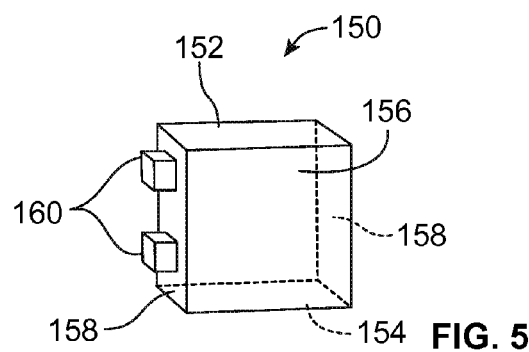
FIG. 5 is a perspective view of one of the battery cells from the tilted stacks of FIG. 4.
Figure 6A:
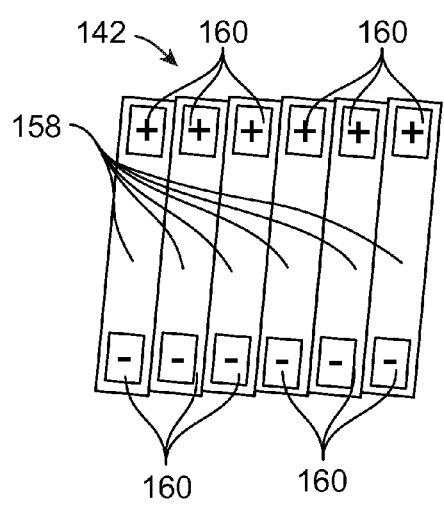
FIG. 6A is a side view of a portion of one of the battery cell arrays of FIG. 4.
Figure 6B:
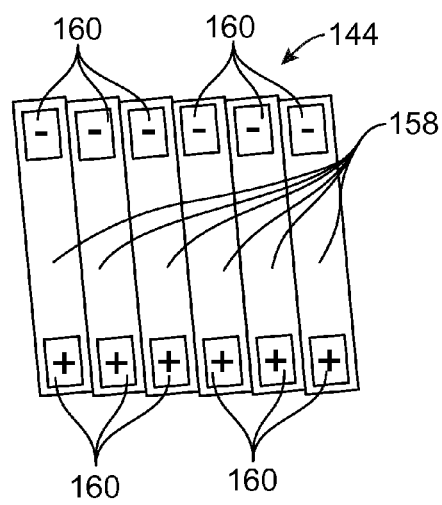
FIG. 6B is a side view of a portion of one of the battery cell arrays of FIG. 4.
Figure 6C:
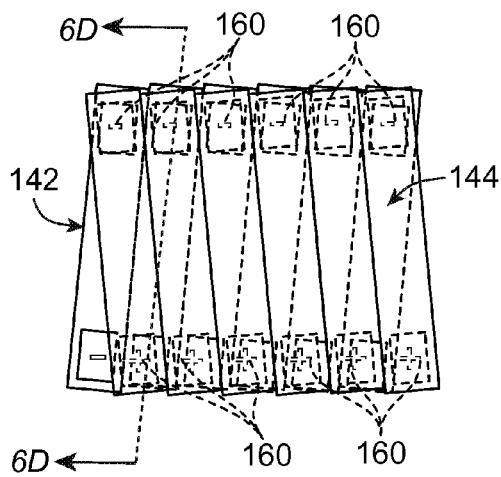
FIG. 6C is an illustrative side view of portions of the battery cell arrays of FIG. 4.
Figure 6D:
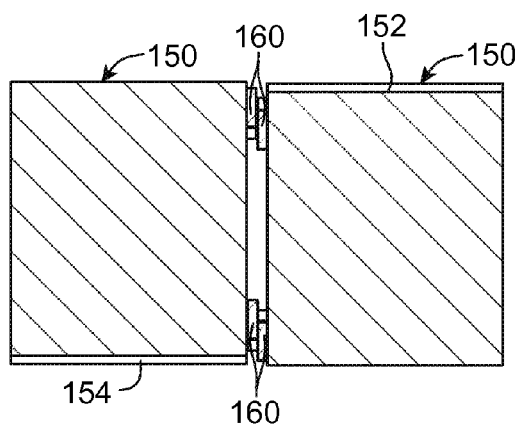
FIG. 6D is a cross-sectional view of FIG. 6C.

As mentioned above, HV batteries may consist of a plurality of battery cells connected to one another in series or in parallel. For battery cells, such as prismatic cells and pouch cells, connected in series, the positive terminal of the first cell is electrically connected to the negative terminal of the next cell in the series. A busbar module is typically a separate component which assists in orienting and aligning terminals to facilitate the electrical connection between the cells and/or to assist in orienting busbars which span between the terminals. FIG. 3 shows an example of a HV battery 100 having a plurality of battery cells 102 which are electrically connected in series via busbars. A busbar module 108 assists in orienting the busbars and terminals 110 of the battery cells 102. As shown in FIG. 3, the terminals 110 extend from an upper face of the battery cells 102 and the battery cells 102 are oriented in a vertical formation. This location of the terminals 110 may require additional components to facilitate the series electrical connection between the battery cells 102. Alternatively, direct cell-to-cell electrical connection between terminals of a battery cell array may provide packaging advantages and reduce a number of supporting components, such as busbar modules.

FIGS. 4 through 7C show an example of a portion of a traction battery assembly 140 having a first battery cell array 142, a second battery cell array 144, and a frame 148 which may retain the battery cell arrays 142 and 144 therebetween. The first battery cell array 142 and the second battery cell array 144 may each have a plurality of battery cells 150. The battery cells 150 may each define an upper face 152, a lower face 154, opposing front faces 156, and opposing side faces 158. The battery cells 150 may be prismatic cells. A pair of terminals 160 may extend from each of the battery cells 150. Each of the terminals 160 may define a substantially flat contact surface. In this example, the terminals 160 may extend from upper and lower portions from one of the opposing side faces 158 of the battery cells 150. One of the terminals 160 is a positive terminal and the other of the terminals 160 is a negative terminal. The battery cells 150 may be oriented in tilted stacks such that the terminals 160 of at least one of the battery cells 150 of one of the battery cells arrays 142 and 144 are aligned with oppositely charged terminals 160 of two different battery cells 150 of the other array. For example, the first battery cell array 142 may have the positive terminals located at the upper portions of one of the opposing side faces 158 and the negative terminals located at the lower portions of one of the opposing side faces 158. In this example, the second battery cell array 144 may have the positive terminals located at the lower portions of one of the opposing side faces 158 and the negative terminals located at the upper portion of one of the opposing side faces 158. Further, the terminals 160 from the battery cell array 142 and the battery cell array 144 may be facing one another.

Figure 7A:
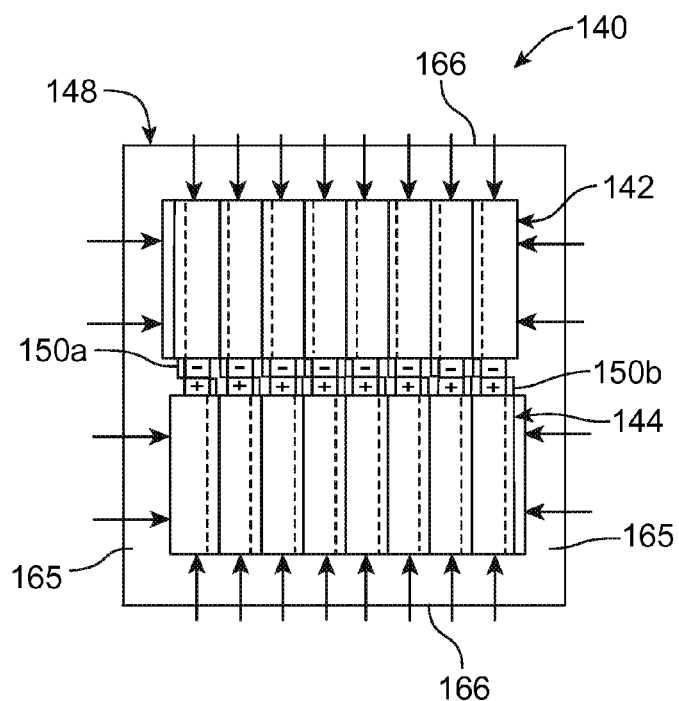
FIG. 7A is a plan view of the portion of the traction battery assembly from FIG. 4.
Figure 7B:
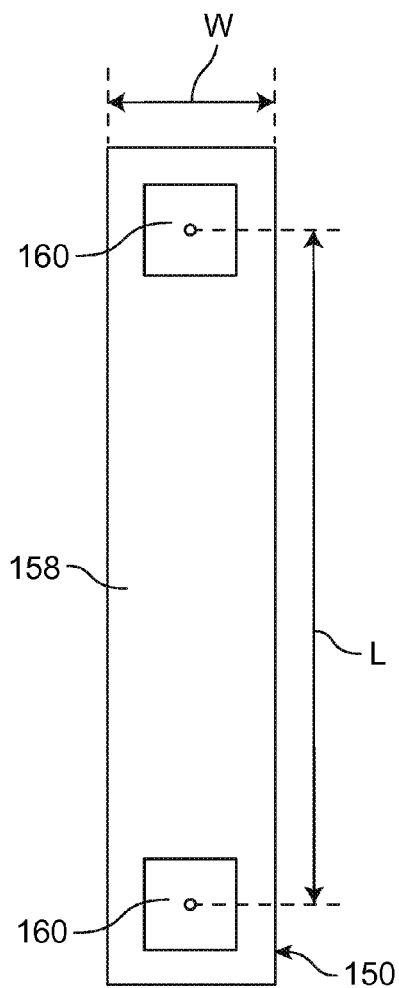
FIG. 7B is a side view of one of the battery cells of FIG. 4 showing dimensions used in calculating an angle of orientation of the battery cells in the tilted stack of FIG. 4.
Figure 7C:
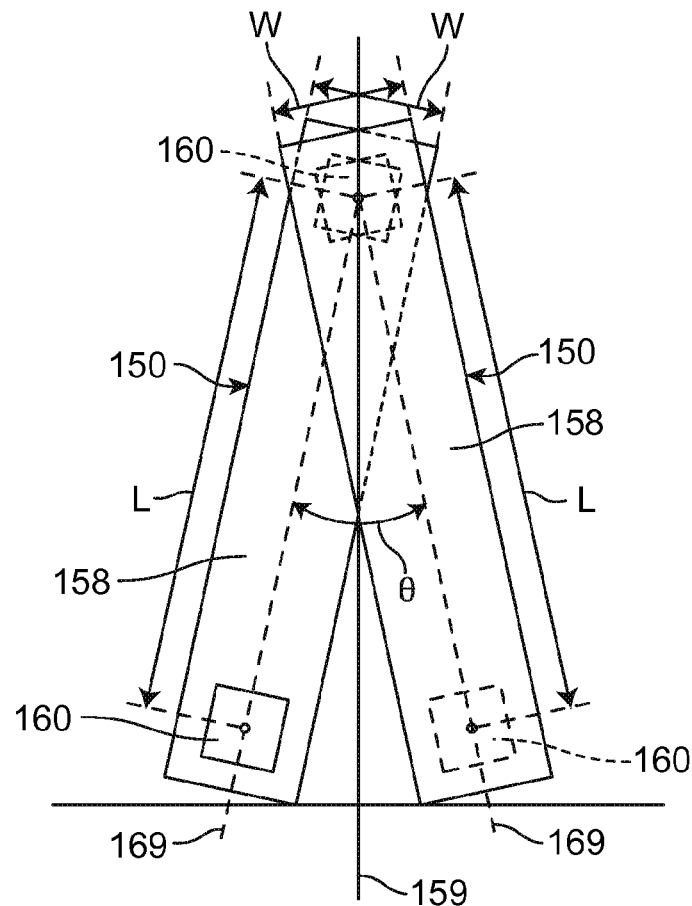
FIG. 7C is an illustrative side view of two of the battery cells of FIG. 4 showing examples of dimensions and angles of orientation of the battery cells in the tilted stack of FIG. 4.

The frame 148 may support and orient the battery cells 150 of the battery cell arrays 142 and 144. For example, the battery cells 150 may be oriented in tilted stacks such that the battery cells 150 are tilted at a tilt angle relative to the frame 148 or a component beneath the battery cells 150 such as a battery tray (not shown) or thermal plate (not shown). The battery cells 150 of the first battery cell array 142 may be tilted in a direction opposite the tilt of the battery cells 150 of the second battery cell array 144. As such, the positive and negative terminals of the terminals 160 may be aligned, in registration, and/or in contact with the oppositely charged terminals 160 of two different battery cells 150 of the other array, thus eliminating inclusion of a busbar module within the traction battery assembly 140. In one example, the battery cells 150 may be oriented such that the battery cells 150 of the first battery cell array 142 are tilted at a first angle relative to a vertical axis 159 and the battery cells of the second array at a second angle of the same magnitude of the first angle but in an opposite direction relative to the vertical axis 159. A degree of the first and second angles may be based on a width and length of one of the side faces 158 of the battery cells 150 to facilitate the alignment of the terminals 160 for the battery cells 150 in the tilted stack. For example, FIG. 7B is a plan view of one of the battery cells 150 having a width ("W"), and a length ("L") defined by a distance between center points of the terminals 160. An angle between two of the battery cells 150 oriented in the tilted stack with aligned terminals 160 is represented by Θ as shown in FIG. 7B. Thus, the tilt angle of each of the first battery cell array 142 and the second battery cell array 144 may be represented as Θ/2 relative to the vertical axis 159 and where sin 2Θ=W/L. Planes defined by terminal axis centerlines 164 may define the angle Θ. Planes defined by two of the front faces 156 of different battery cells 150 may define the angle Θ. The vertical axis 159 may extend substantially perpendicularly from a surface supporting the battery cells 150. It is contemplated that under certain conditions, one or more components may be located between adjacent battery cells 150. The one or more components may be, for example, a cell spacer, fin, or thermal plate. When one or more components are included between adjacent battery cells 150, the width W may be defined by the width of the battery cell 150 and the width of the one or more components. Plates (not shown) having conductive and impedance characteristics may be fused between opposing terminals 160 to assist in facilitating the electrical connection between the battery cells 150.

The frame 148 may include endplates 165 and side components 166 which may be configured to apply one or more clamping loads to compress the battery cell arrays 142 and 144 against one another. For example, the positive and negative terminals of the terminals 160 may contact the respective oppositely charged terminals when compressed to facilitate an electrical series connection across the battery cell arrays 142 and 144. Arrows included in FIG. 7A illustrate an example of directions of the compression forces which may be applied to the battery cell arrays 142 and 144. In this example, each of the battery cell arrays 142 and 144 may have a battery cell 150 at opposite longitudinal ends of the arrays with a terminal which is not in electrical communication with another battery cell 150, such as a terminal 150a of the battery cells 150 of the battery cell array 142 and a terminal 150b of the battery cells 150 of the battery cell array 144. Terminals 150a and 150b may be in electrical connection with other components, such as a wire harness or electrical output conductor.

Figure 8A:
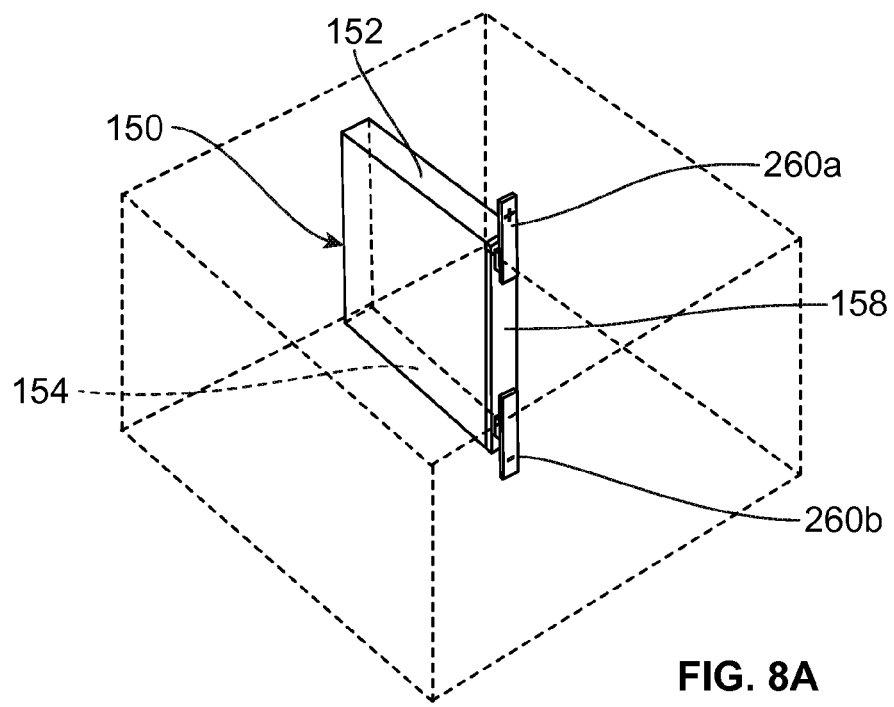
FIG. 8A is a perspective view of a battery cell having terminal tabs.
Figure 8B:
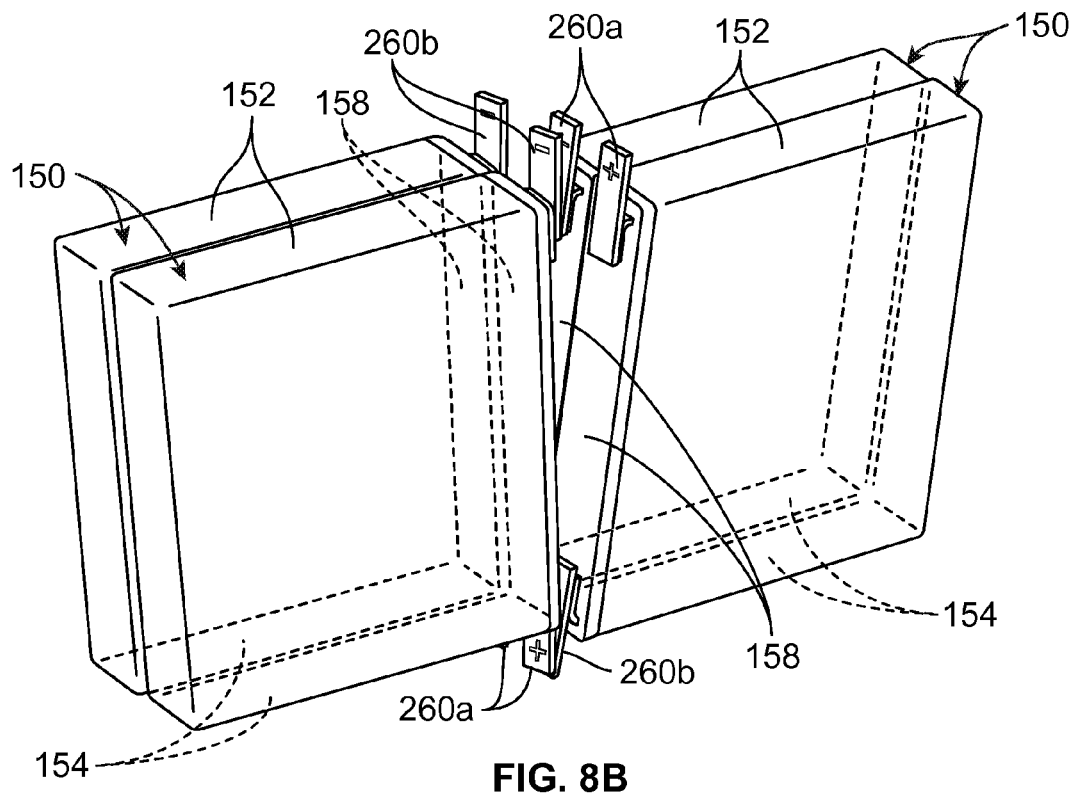
FIG. 8B is a perspective view of battery cells having terminal tabs oriented in tilted stacks with the terminal tabs facing one another.

FIGS. 8A through 8D show examples of alternative terminal configurations which may be utilized with the battery cells 150 when oriented in tilted stacks. In FIGS. 8A and 8B, the battery cell 150 may include a positive terminal tab 260a and a negative terminal tab 260b which may be referred to as terminal tabs 260a and 260b. The terminal tabs 260a and 260b may at least partially extend through respective planes 262a and 262b, which may be defined by the upper face 152 and the lower face 154 of the battery cell 150. The terminal tabs 260a and 260b may be oriented and aligned to contact oppositely charged terminal tabs of two other battery cells 150. The positive terminal tab 260a and the negative terminal tab 260b may be joined to one another to facilitate and electrical connection therebetween. Examples of joining methods include ultrasonic welding and resistance welding.

Figure 8C:
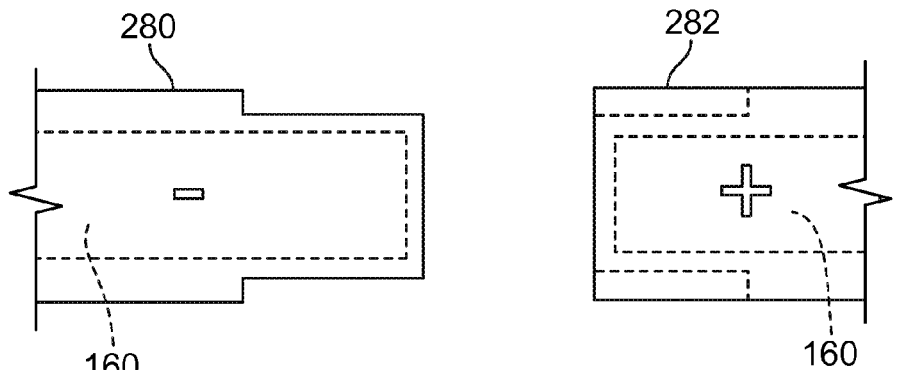
FIG. 8C is an illustrative plan view of two terminal tabs and two connectors prior to mating.
Figure 8D:
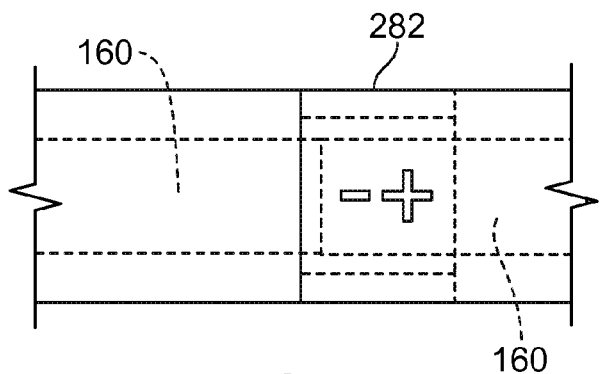
FIG. 8D is an illustrative plan view of the two terminal tabs and two connectors from FIG. 8C showing the connectors mated.
Figure 9:
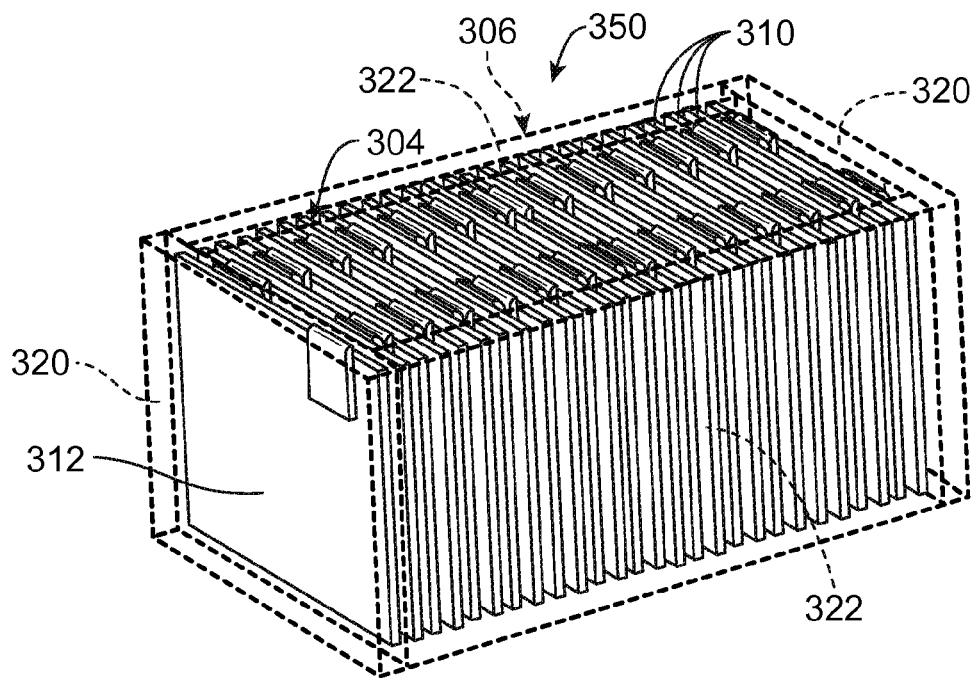
FIG. 9 is a perspective view of a portion of another traction battery assembly including a battery cell array having a plurality of battery cells.
Figure 10:
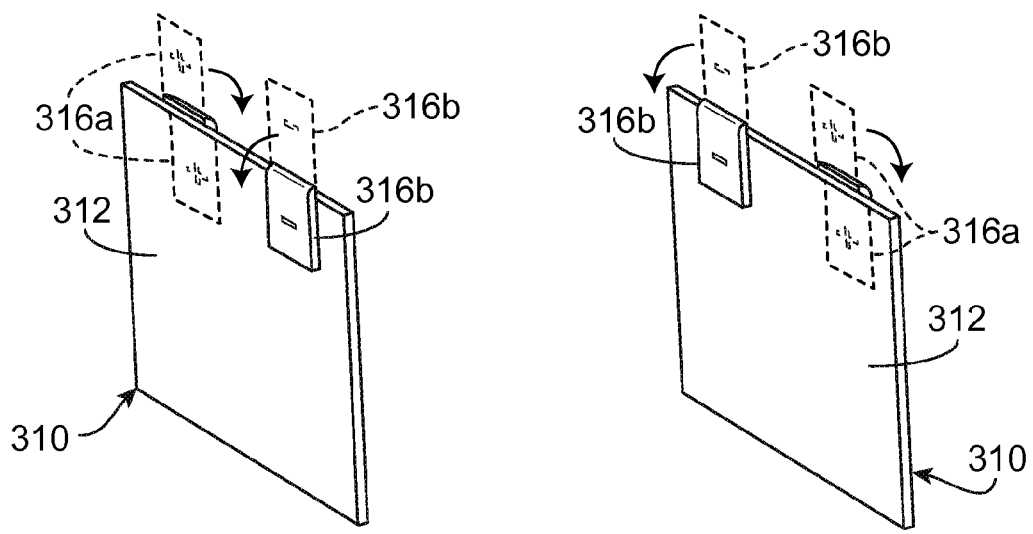
FIG. 10 is a perspective view of two of the battery cells of FIG. 9 showing foil terminals folded over to partially cover opposing faces of the respective cells.

One or more connectors may be configured to receive and align the terminals 160 such that oppositely charged terminals 160 may be electrically connected when the connectors mate. For example, FIGS. 8C and 8D show a male connector 280 and a female connector 282 which may each house a positive or negative terminal 160. The male connector 280 and the female connector 282 may be configured to mate with one another such that the oppositely charged terminals 160 contact one another to facilitate an electrical connection therebetween. It is contemplated that a single connector (not shown) may be configured to receive oppositely charged terminals 160 such that the oppositely charged terminals 160 contact one another to facilitate an electrical connection therebetween.

FIGS. 9 through 12 show an example of a portion of a traction battery assembly 300 which may include a battery cell array 304 having a plurality of battery cells 310. A frame 306 may support and retain the battery cells 310. The battery cells 310 may each have opposing front faces 312. A pair of terminals may extend from an upper portion or upper end of each battery cell 310. The battery cells 310 may be pouch cells. A pouch cell may include conductive positive and negative foil terminals which resemble tabs extending from a body of the pouch cell. The foil terminals may be welded to an electrode within the pouch cell. Pouch cells may use a foil bag or pouch to retain the components of the cell therein instead of a substantially rigid case as is commonly used with prismatic cells. The terminals of the battery cells 310 may be folded over onto alternate opposing front faces 312. For example, a positive foil terminal 316a may partially cover one of the opposing faces 312 and a negative foil terminal 316b may partially cover the other of the opposing faces 312. An electrical insulator component (not shown) may be secured to the battery cells 310 at locations under which the respective positive foil terminal 316a and the negative foil terminal 316b partially cover. The battery cells 310 may be stacked such that the positive foil terminals 316a are aligned with negative foil terminals 316b of adjacent cells. The battery cells 310 at the outer ends of the battery cell array 304 may have an electrical connection with other components of the traction battery assembly 300, such as a wire harness and an electrical output conductor.

Figure 11:
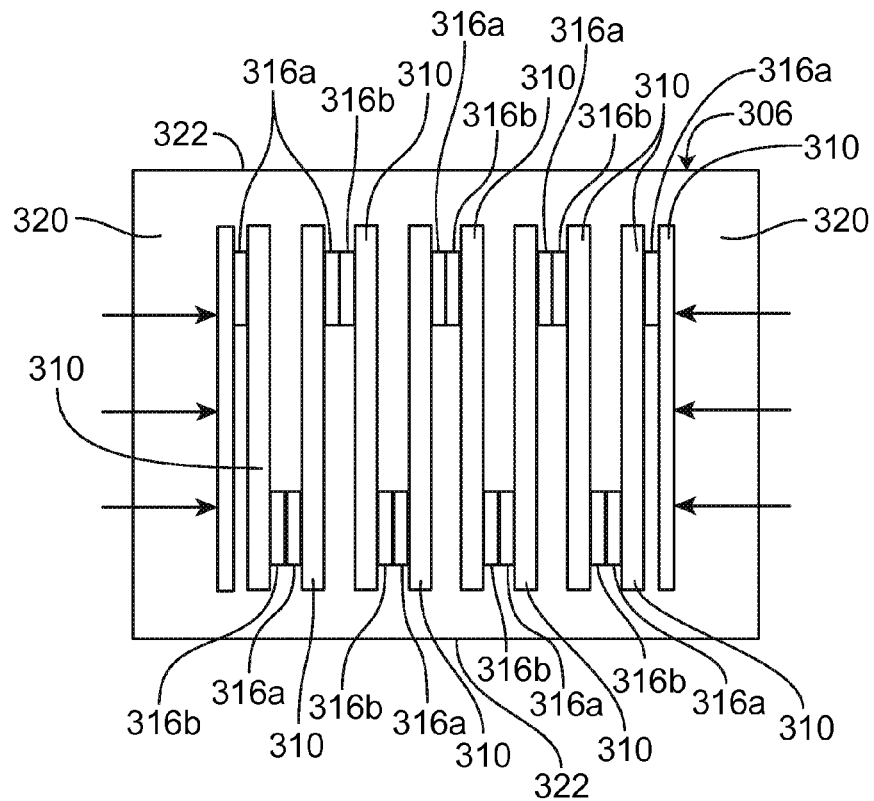
FIG. 11 is a plan view of the portion of the traction battery assembly of FIG. 9.

The frame 306 may include components, such as endplates 320 and side components 322. The endplates 320 may be configured to apply opposing longitudinal compression forces, or clamping loads, to the battery cells 310. The side components 322 may be configured to apply opposing lateral compression forces, or clamping loads, to the battery cells 310. The longitudinal compression forces and the lateral compression forces may be such that the positive foil terminals 316a and the negative foil terminals 316b contact one another to assist in facilitating a series electrical connection across the battery cell array 304. Arrows included in FIG. 11 illustrate an example of directions of the compression forces which may be applied to the battery cell array 304. In this example, a busbar module may not be required since the positive foil terminals 316a and the negative foil terminals 316b do not extend above the battery cell array 304 and are instead contacting one another. The battery cells 310 may be spaced apart such that a component, such as a cell spacer (not shown) may be disposed between the cells. In this example, the cell spacer may be sized such that the positive foil terminals 316a and the negative foil terminals 316b of adjacent battery cells 310 may still contact one another. Plates (not shown) having conductive and impedance characteristics may be fused between the positive foil terminals 316a and the negative foil terminals 316b to assist in facilitating the electrical connection between the battery cells 310.

Figure 12:
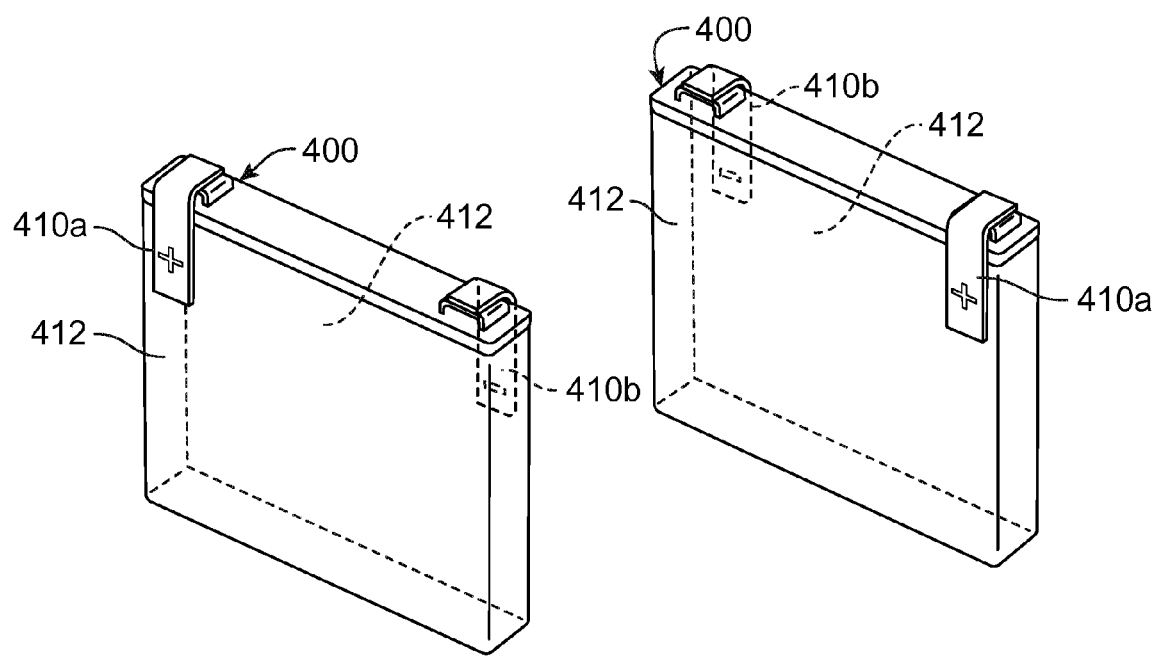
FIG. 12 is a perspective view of another two battery cells showing terminal tabs folded over to partially cover opposing faces of the respective cells.

FIG. 12 shows an example of two prismatic battery cells 400 which may each include a positive terminal tab 410a and a negative terminal tab 410b on an upper portion or upper end of the battery cells 400. The terminal tabs 410a and 410b may be folded over onto alternate opposing front faces 412. For example, the positive terminal tab 410a may partially cover one of the opposing faces 412 and the negative terminal tab 410b may partially cover the other of the opposing faces 412. An electrical insulator component (not shown) may be secured to the battery cells 400 at locations under which the respective terminal tabs 410a and 410b partially cover. The battery cells 400 may be stacked such that the positive terminal tabs 410a are aligned with the negative terminal tabs 410b of adjacent cells. A plurality of battery cells 400 may be stacked in a fashion similar to that of the battery cell array 304.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
first and second arrays spaced apart and each having prismatic cells each with a positive and a negative terminal on a cell side face facing the other array, wherein the cells are oriented in tilted stacks with the terminals of at least one of the cells of the first array aligned in between the cell side faces with oppositely charged terminals of two different cells of the second array.

2. The assembly of claim 1, further comprising a frame supporting and orienting the cells such that the cells of the arrays are tilted at opposing and inversely equal angles which are based on a width and length of each battery cell to facilitate the alignment of the terminals of at least one of the cells of the first array with the oppositely charged terminals of two different cells of the second array.

3. The assembly of claim 2, wherein the positive and negative terminals define substantially flat contact surfaces.

4. The assembly of claim 3, wherein the frame is configured to apply a lateral compression force against each of the arrays such that the aligned positive and negative terminals at least partially contact one another.

5. The assembly of claim 3, wherein the terminals are tabs extending at least partially through planes defined by respective upper and lower faces of the respective cell, and wherein the tabs are joined together.

6. The assembly of claim 1, wherein at least one of the positive terminals and at least one of the negative terminals at opposite longitudinal ends of the arrays are in electrical connection with a wire harness or electrical output conductor.

7. The assembly of claim 1, wherein the at least one of the cells of the first array is tilted at a first angle and wherein the two different cells of the second array are tilted at a second angle, and wherein a degree of the first and second angles relative to a vertical axis is based on a cell width and cell length.

8. A traction battery assembly comprising:
first and second arrays each having a plurality of cells with a positive and a negative terminal facing the opposite array, wherein the positive terminals of the cells of the first array are located at an upper portion of a cell side face and the negative terminals of the cells of the second array are located at an upper portion of a cell side face; and a frame orienting the cells of both arrays in opposing tilted orientations such that some of the positive terminals of the first array are in registration with some of the negative terminals of the second array.

9. The assembly of claim 8, further comprising a plurality of plates fused between the respective positive and negative terminals in registration with one another.

10. The assembly of claim 8, wherein the assembly does not include a busbar module.

11. The assembly of claim 10, wherein the frame comprises opposing longitudinal components configured to apply a clamping load in a first direction to the first array and a clamping load in a second direction to the second array, wherein the clamping loads are such that the respective positive and negative terminals in registration with one another are in at least partial contact with one another.

12. The assembly of claim 8, wherein the tilted orientations of the cells of both arrays are based on a width and length of the cell such that the terminals of at least one of the cells of the first array are in registration with oppositely charged terminals of two different cells of the second array.

13. The assembly of claim 12, wherein the cells are prismatic cells.

14. The assembly of claim 8, wherein the positive and negative terminals of each cell are located on only one face of the cell.

15. The assembly of claim 8, further comprising male or female connectors housing each of the terminals such that oppositely charged terminals are electrically connected when the respective male and female connectors mate.

16. The assembly of claim 8, wherein the terminals are tabs extending at least partially through planes defined by respective upper and lower faces of the respective cell, and wherein the tabs are ultrasonically welded together.

17. A traction battery assembly comprising:

a plurality of prismatic battery cells each including opposing faces having a metallic housing separated by an upper end, a positive terminal extending from the upper end and folded to partially cover one of the faces, and a negative terminal extending from the upper end and folded to partially cover the other of the faces; and an electrical insulator component disposed between the respective face and terminal, wherein the plurality of cells are stacked such that terminals of opposing polarity are aligned in between adjacent battery cells.

18. The assembly of claim 17, further comprising a frame supporting the cells and including longitudinal end plates configured to apply opposing longitudinal compression forces to the cells such that the positive terminals contact the respective negative terminals of the adjacent cell.

* * * * *